E. W. BEMIS.
CHUCK.
APPLICATION FILED MAY 6, 1918.
1,320,113.
Patented Oct. 28, 1919.
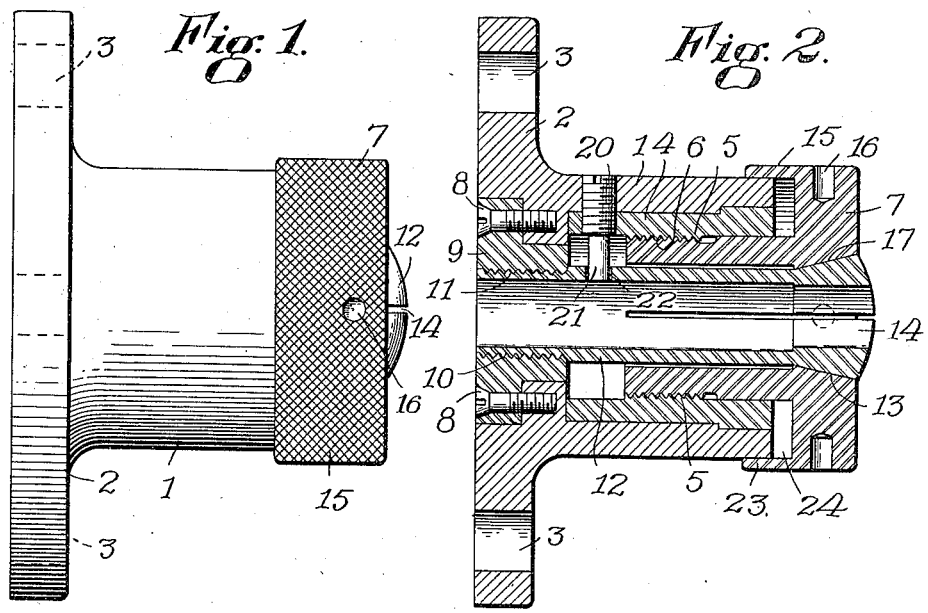
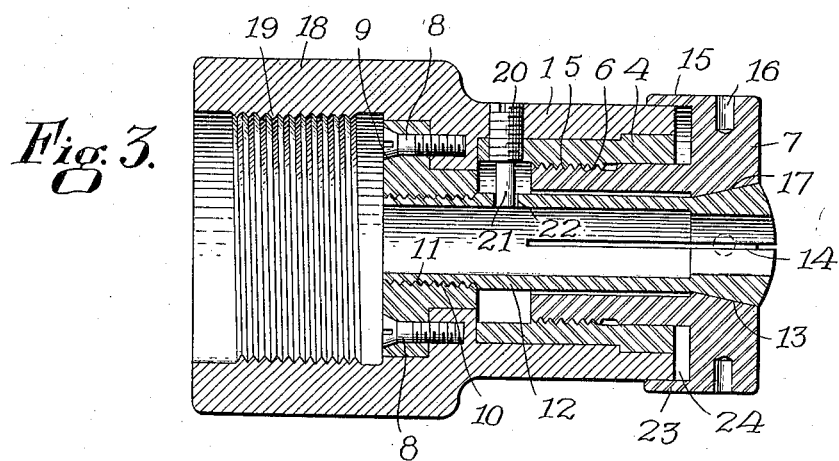
Inventor
E. W. Bemis
By Attorney
Geo. H. Kennedy

UNITED STATES PATENT OFFICE.

EDGAR W. BEMIS, OF WORCESTER, MASSACHUSETTS.

CHUCK.

1,320,113.      Specification of Letters Patent.      Patented Oct. 28, 1919.

Application filed May 6, 1918. Serial No. 232,779.

*To all whom it may concern:*

Be it known that I, EDGAR W. BEMIS, a citizen of the United States, residing at Worcester, in the county of Worcester and Commonwealth of Massachusetts, have invented a new and useful Improvement in a Chuck, of which the following, together with the accompanying drawings, is a specification.

The object of my present invention is to provide a work holding chuck, especially adapted for use in connection with a metal turning lathe, and I have illustrated the preferable form of its embodiment by the accompanying drawings, in which—

Figure 1 is a side elevation of my improved chuck.

Fig. 2 is a central sectional view.

Fig. 3 is a central sectional view of a modified form.

Similar reference characters refer to similar parts in the different figures.

Referring to the accompanying drawings, 1 denotes the body portion of the chuck provided in the form shown in Figs. 1 and 2 with a circular flange 2 having holes 3 corresponding with similar holes in the face plate of a lathe to which the chuck may be attached by bolts passing through the holes 3 and the corresponding holes of the face plate. The flange 2 and body 1 may be made of cast iron, and within the body 1 I place a bushing 4 having an internal screwthread 5 to receive the external screwthreads 6 of a collar 7 extending into an annular space inclosed in the body. Attached to the body portion of the chuck by screws 8 is an annular bushing 9 having an internal screwthread 10 to receive the external screwthread 11 of the sleeve 12, having its outer end beveled at 13, said sleeve being slotted at three or more points in its circumference, one of said slots being shown at 14. The exterior surface 15 of the collar 7 is knurled, to enable the collar to be rotated by hand for the purpose of tightening the slotted sleeve 12. The collar 7 is also provided with spanner holes 16 for the application of a spanner wrench in order to securely tighten the chuck upon the work. The bushings 4 and 9 are preferably made of steel and the collar 7 and slotted sleeve 12 are also preferably made of steel in order to increase the durability of the screwthreaded connection between these parts. The interior of the collar 7 is beveled, as shown at 17, to fit the beveled surface 13 of the sleeve 12.

My improved chuck is operated as follows:—The flange 2 having been attached to the face plate of a lathe in position to bring the axis of the chuck in alinement with the axis of the live spindle of the lathe, the collar 7 is screwed into the bushing 4 to carry the beveled surface 17 off the beveled surface 13 to allow the work to be entered within the slotted sleeve 12. The collar 7 is then screwed outwardly by means of the knurled surface 15, until the beveled surface 17 is brought into contact with the beveled surface 13, when a spanner is applied to the collar 7 to forcibly tighten the collar upon the beveled surface of the sleeve 12 to hold the work.

In Fig. 3 I have shown a slight modification in the form of my improved chuck which consists in omitting the flange 2 and expanding the body of the chuck to form a sleeve 18, which is provided with an internal screwthread 19 adapted to be screwed upon the live spindle of the lathe. The work holding parts of my modified chuck, as shown in Fig. 3, are precisely the same as the corresponding parts shown in Figs. 1 and 2, and the operation of the chuck is the same. The modification shown in Fig. 3 relates solely to the application of the chuck to the live spindle of the lathe instead of the face plate.

The rotatable collar 7 is provided with a flange 23 which extends over the body 1, to close the gap 24 between the end of the body and the collar and prevent the admission of dirt. The collar 7 is also spaced from the sleeve 12, except at the beveled surface 17, so that as soon as the surface 17 is separated from the beveled surface 13 of the sleeve 12, the collar 7 may be easily rotated by means of the knurled surface 15.

The sleeve 12 is held from rotation on its screw-threaded connection with the bushing 9 by means of a screw 20, held in the body of the chuck, and having a plain tip 21 which enters a hole 22 in the sleeve. The body of the chuck and the flanged collar present an unbroken surface with no projections or recesses for the lodgment of dirt or lint.

I claim,

1. In a chuck, in combination, a body portion provided with means for its attachment to an operating member and having an opening therethrough, an interiorly screw threaded bushing attached to the body portion at one end of said opening, a split screw threaded sleeve engaging said bushing and having at its opposite end a divergent beveled surface, means for holding said sleeve from rotation, an annular screw threaded bushing attached to the body portion and inclosing an annular space between said bushing and said sleeve, and a collar provided with a beveled surface fitting the beveled surface of said sleeve and having a screw threaded portion extending into said annular space and engaging said bushing.

2. In a chuck, in combination, a body portion having means for its attachment to an operating member and having an opening therethrough, a separate split sleeve held at one end from longitudinal movement in said body portion with an annular space between said sleeve and said body portion, means for holding said sleeve from rotation in said body, an outer divergent beveled surface at the opposite end of said split sleeve, a rotatable collar having an interior beveled surface fitting the beveled surface of said sleeve and having a portion extending into said annular space, and means, when said collar is rotated, for imparting a longitudinal movement thereto.

3. In a chuck, in combination, a body portion having an opening therethrough, a separate split sleeve held at one end in said body portion and having an opening therethrough in alinement with the opening in said body portion, said sleeve having at its opposite end an exterior divergent beveled surface, a collar provided with an interior beveled surface fitting the exterior beveled surface on said sleeve, an exterior screw thread engaging an interior screw thread on said body, whereby said collar is given a longitudinal movement by its rotation, said collar having a flange overlapping said body portion.

4. In a chuck, in combination, a body portion having an opening therethrough, a split sleeve having a screw threaded connection at one end with the body portion and having a beveled surface at the opposite end, means for holding the sleeve from rotation, said sleeve having an opening therethrough in alinement with the opening in the body portion, said body portion inclosing an annular space between the body portion and sleeve and having an interior screw thread, a rotatable collar having an interior beveled surface fitting the beveled surface of the split sleeve, said collar extending into said annular space and provided with an exterior screw thread engaging the screw thread carried by said body portion.

EDGAR W. BEMIS.

Witnesses:
NELLIE WHALEN,
PENELOPE COMBERBACH.

Copies of this patent may be obtained for five cents each, by addressing the "Commissioner of Patents, Washington, D. C."